Feb. 7, 1933.  R. C. ZEIDLER  1,896,388
LOCK FOR SCREW THREADED DEVICES
Filed Jan. 12, 1931

INVENTOR.
REINHOLD CARL ZEIDLER
BY Barnes & Kisselle
ATTORNEYS.

Patented Feb. 7, 1933

1,896,388

UNITED STATES PATENT OFFICE

REINHOLD CARL ZEIDLER, OF DETROIT, MICHIGAN, ASSIGNOR TO LONG MANUFACTURING COMPANY, OF DETROIT, MICHIGAN, A CORPORATION OF MICHIGAN

LOCK FOR SCREW THREADED DEVICES

Application filed January 12, 1931. Serial No. 508,038.

This invention relates to the locking of screw threaded devices such as studs, cap screws, nuts or the like. The invention is directed particularly toward the provision in devices of this character of distortable portions capable of being distorted to effect the locking action, and in connection with this, the device or article which receives the stud or the like may be constructed to cooperate with the distorted part. The structure, as in a stud or cap screw may have the distortable part formed in or as a part of the head or tool-receiving part for turning purposes. The same is true of a nut.
The distorting of the metal may be accomplished by means of a suitable tool, and once such device is locked in position it is securely held and kept from becoming loose. The invention will be better understood by reference to the accompanying drawing, and the following detailed description.

Figure 2:
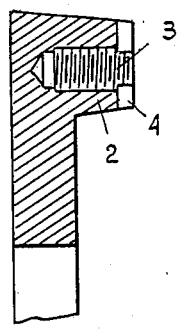
Fig. 2 is a sectional view taken substantially on line 2—2 of Fig. 1.
Figure 1:
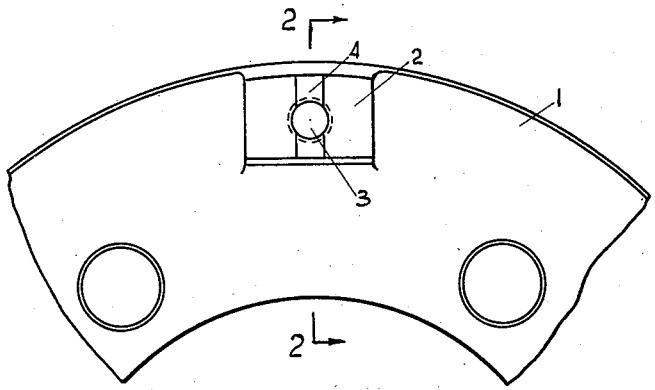
Fig. 1 is a view of a device which in the present instance happens to be a pressure ring of a clutch designed to receive a stud constructed in accordance with the invention.

A device or article designed to receive a screw threaded member is shown in Figs. 1 and 2 in the form of a plate or ring 1 provided with a stud-receiving boss 2 with an internally threaded hole 3. The face of the boss 2 against which the head of a screw threaded member may seat, is provided with a groove 4.

Figure 3:
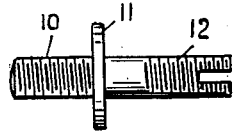
Fig. 3 is a side elevation of a stud.
Figure 4:
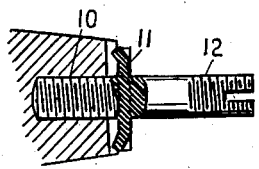
Fig. 4 is a view of the stud mounted and distorted.

A stud designed to cooperate with such a receiving member, is shown in Fig. 3, having a screw threaded end 10, a shoulder or flange 11, and an exposed end 12 designed for attachment to any other device, and for any purpose. The head 11 may be square or hexagonal for receiving a tool or wrench for screwing the stud into the aperture 3, and the flange or head 11 is designed to seat upon the boss 2, as shown in Fig. 4.

Figure 7:
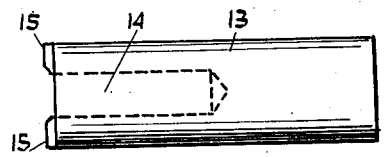
Fig. 7 illustrates a tool which may be employed with the stud for distorting the metal to lock the same in place.

The flange 11 is of a thickness which will permit of it being fairly readily distorted, yet the thickness is such as to provide for the necessary strength. As shown in Fig. 4 the flange is distorted so that part of it is bent into the recess 4, as illustrated. This may be accomplished by a suitable tool as shown in Fig. 7 having a shank 13 hollowed as at 14 for fitting over the end 12 of the stud and provided with ribs 15 designed to seat upon the flange 11. This tool may be fitted over the stud as described and force applied thereto by means of a hammer or automatic machinery to distort the flange 11 and to throw parts of its metal into the groove 4. This securely locks the stud in place to prevent it from loosening. This forms a very effective lock to the elimination of other and separate locking elements such as lock washers or the like, and in fact permits removing the stud only by shearing part of the metal.

Figure 5:
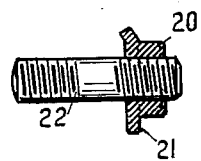
Figs. 5 and 6 are views, respectively, of a nut and cap screw in which the invention may be embodied.
Figure 6:
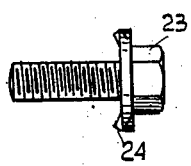
Figure 8:
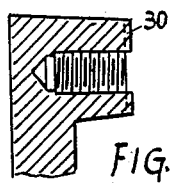
Figs. 8 and 9 are views illustrating a modified form of the invention.

The invention as shown in Fig. 5 is incorporated in a nut. The body of the nut illustrated at 20 is designed to receive a suitable turning tool or the like, and integral with the body is a distortable flange 21. The nut is shown applied to a bolt or the like 22. A cap screw is shown in Fig. 6. The tool-receiving head is illustrated at 23 with the distorted portion of the head or flange at 24.

Figure 9:
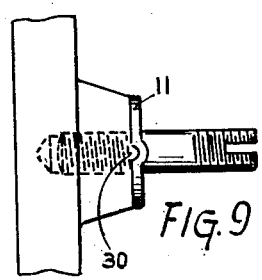

A modified form contemplates employing a rib 30 on a receiving member 1 in place of the groove 4, in which case the distortable flange or head, as for example flange 11 of the cap screw, may be distorted or thrown down around the rib as illustrated in Fig. 9. However, the form shown in Figs. 1 to 6 is thought to be preferred because that provides a flat seat for the head, and further, the walls of the groove need not necessarily be accurately machined but left in the rough. Accordingly, the face of the seat on the plate for receiving the head may be finished as desired, and the presence of the groove offers no difficulty or requires no additional attention or operations.

I claim:

A stud for association with a supporting member having an internally threaded aperture and a seat around the aperture, and wherein the seat has a portion lying out of the normal plane of the seat, said stud having a body externally threaded at opposite ends, and a relatively thin flange intermediate the ends of the stud and disposed between said screw threaded portions, said flange being shaped for the reception of a tool or the like whereby one end of the stud may be screwed in said aperture with the flange abutting the seat, said flange having sufficient strength for tightly screwing the stud into the aperture when turned by the tool, and said flange being distortable whereby portions of it may be distorted into cooperative relation with the said portion of the seat which lies out of the normal plane of the seat to lock the stud in place.

In testimony whereof I affix my signature.

REINHOLD CARL ZEIDLER.